United States Patent
Kurata et al.

(10) Patent No.: US 11,510,371 B2
(45) Date of Patent: Nov. 29, 2022

(54) AGRICULTURAL MACHINE

(71) Applicant: KUBOTA CORPORATION, Osaka (JP)

(72) Inventors: Ryo Kurata, Sakai (JP); Susumu Umemoto, Sakai (JP); Shinnosuke Ishikawa, Sakai (JP); Zerbino Fulvio, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 192 days.

(21) Appl. No.: 17/020,867

(22) Filed: Sep. 15, 2020

(65) Prior Publication Data
US 2021/0084825 A1     Mar. 25, 2021

(30) Foreign Application Priority Data

Sep. 20, 2019 (JP) .............................. JP2019-172150

(51) Int. Cl.
*A01F 15/08* (2006.01)

(52) U.S. Cl.
CPC .......... *A01F 15/0883* (2013.01); *A01F 15/08* (2013.01); *A01F 15/0833* (2013.01); *A01F 2015/0808* (2013.01); *A01F 2015/0891* (2013.01)

(58) Field of Classification Search
CPC .. A01F 15/08; A01F 15/0833; A01F 15/0825; A01F 15/0875; A01F 15/0883; A01F 2015/0808; A01F 2015/0891
See application file for complete search history.

(56) References Cited

U.S. PATENT DOCUMENTS

| | | | |
|---|---|---|---|
| 7,353,753 B2 | 4/2008 | Viaud | |
| 2001/0042362 A1* | 11/2001 | Scarlett | A01F 15/00 56/10.2 G |
| 2009/0202322 A1* | 8/2009 | Gette | A01F 15/071 414/24.5 |
| 2018/0368331 A1 | 12/2018 | Kurata et al. | |
| 2019/0000012 A1 | 1/2019 | Yagyu et al. | |
| 2020/0122623 A1 | 4/2020 | Kuriyagawa et al. | |
| 2020/0130693 A1 | 4/2020 | Yagyu et al. | |

(Continued)

FOREIGN PATENT DOCUMENTS

| | | | | |
|---|---|---|---|---|
| EP | 3036986 A1 * | 6/2016 | ......... | A01F 15/0825 |
| EP | 3 162 189 A2 | 5/2017 | | |

(Continued)

OTHER PUBLICATIONS

Official Communication issued in corresponding European Patent Application No. 20196569.6, dated Feb. 5, 2021.

(Continued)

*Primary Examiner* — Jimmy T Nguyen
(74) *Attorney, Agent, or Firm* — Keating and Bennett, LLP (57) ABSTRACT

An agricultural machine includes a baler controller configured or programmed to obtain an ejector inclination value from a positional relation between a tractor inclination sensor and a bale ejector of a baler, the ejector inclination value being a sensor value of the inclination sensor corresponding to the bale ejector, and to allow ejection of the bale when a size of the bale in the baler is larger than a first threshold value and the ejector inclination value is less than a second threshold value.

4 Claims, 6 Drawing Sheets

(56) References Cited

U.S. PATENT DOCUMENTS

2020/0146209 A1  5/2020  Yagyu et al.
2020/0189387 A1  6/2020  Yagyu et al.

FOREIGN PATENT DOCUMENTS

| EP | 3 355 682 A1 | 8/2018 |
| EP | 3 417 697 A1 | 12/2018 |
| JP | 2018-102203 A | 7/2018 |
| JP | 2019-004729 A | 1/2019 |
| JP | 2019-006372 A | 1/2019 |
| WO | 2017/058006 A1 | 4/2017 |

OTHER PUBLICATIONS

Official Communication issued in corresponding Japanese Patent Application No. 2019-172150, dated Aug. 2, 2022.

\* cited by examiner

| TRAVELED DISTANCE | SENSOR VALUE |
|---|---|
| X1 | Sx1 |
| X2 | Sx2 |
| X3 | Sx3 |
| X4 | Sx4 |
| ... | ... |

AGRICULTURAL MACHINE

CROSS REFERENCE TO RELATED APPLICATIONS

This application claims the benefit of priority under 35 U.S.C. § 119 to Japanese Patent Application No. 2019-172150 filed on Sep. 20, 2019, the entire contents of which application are hereby incorporated herein by reference.

BACKGROUND OF THE INVENTION

1. Field of the Invention

The present invention relates to an agricultural machine including a baler and a tractor.

2. Description of the Related Art

When a baler carries out a baling operation, the baler is usually attached to a tractor and towed by the tractor. The baler ejects a bale, which is huge and heavy. Accordingly, a place where the bale is ejected is important. Moreover, the bale which is wrapped is often a round bale. Such a bale may roll after ejection, depending on a land shape of the place where the bale is ejected.

In light of the above, U.S. Pat. No. 7,353,753 (Apr. 8, 2008) discloses a baler which includes an inclination sensor and which controls ejection of bales.

SUMMARY OF THE INVENTION

As described above, the bale is often a round bale. In such a case, if a place where a bale is ejected is an inclined place, such as a sloped road, the bale rolls from the place where the bale has been ejected. This causes a safety problem.

U.S. Pat. No. 7,353,753 only discloses controlling ejection of bales by use of the inclination sensor, but does not disclose any specific process.

Preferred embodiments of the present invention provide agricultural machines each capable of placing a bale at a desired position such that the bale does not roll after being ejected.

An agricultural machine in accordance with an aspect of a preferred embodiment of the present invention is an agricultural machine controlling ejection of a bale in a baler attached to a tractor, the agricultural machine including a baler controller configured or programmed to obtain an ejector inclination value from a positional relation between an inclination sensor to detect an inclination of the tractor and a bale ejector of the baler, the ejector inclination value being a sensor value of the inclination sensor, the sensor value corresponding to the bale ejector, and to allow ejection of the bale in a case where (i) a size of the bale in the baler is larger than a first threshold value, and (ii) the ejector inclination value is less than a second threshold value.

According to the above configuration, ejection of the bale is allowed in a case where (i) the size of the bale in the baler is larger than the first threshold value, and (ii) an inclination of the bale ejector which actually ejects the bale is smaller than the second threshold value. In this configuration, ejection of the bale is not allowed in a case where the inclination of the bale ejector is not smaller than the second threshold value, that is, in a case where the inclination is large at a current position of the bale ejector which is a position where the bale is to be actually ejected. Therefore, it is possible to prevent the bale from being ejected in a case where the inclination of the current position of the bale ejector is large. This consequently makes it possible to prevent the bale from rolling due to a ground inclination or the like after the bale has been ejected.

An agricultural machine in accordance with an aspect of a preferred embodiment of the present invention may include a baler controller configured or programmed to obtain, as the ejector inclination value, the sensor value in data in which each traveled distance of the tractor and each sensor value of the inclination sensor are associated with each other, the sensor value thus obtained corresponding to a traveled distance obtained by subtracting a distance between the inclination sensor and the bale ejector from a current traveled distance.

According to the above configuration, it is possible to accurately calculate an actual current position of the bale ejector, so that whether to allow ejection of the bale can be determined by using a sensor value corresponding to the actual current position of the bale ejector.

An agricultural machine in accordance with an aspect of a preferred embodiment of the present invention may include a baler controller configured or programmed to obtain a traveling position of the tractor, and as the ejector inclination value, the sensor value in data in which each traveling position of the tractor and each sensor value of the inclination sensor are associated with each other, the sensor value thus obtained corresponding to a traveling position which is a shortest distance apart from a point where the bale ejector is present.

According to the above configuration, whether to allow ejection of the bale can be determined by using a sensor value at a tractor's traveling position which is closest to the actual current position of the bale ejector.

An agricultural machine in accordance with an aspect of the present invention may include a baler controller configured or programmed to allow ejection of the bale, in a case where while (i) the size of the bale is larger than the first threshold value, (ii) the ejector inclination value stays less than the second threshold value for not less than a predetermined time period after the ejector inclination value having exceeded the second threshold value becomes less than the second threshold value.

According to the above configuration, ejection of the bale is allowed in a case where the ejector inclination value stays less than the second threshold value for not less than a predetermined time period after the ejector inclination value having exceeded the second threshold value becomes less than the second threshold value. In this configuration, ejection of the bale is not allowed immediately after a shift from an inclined state to a state close to a level state, but is allowed after the level state stably continues to a certain extent. This makes it possible to prevent unexpected rolling of the bale.

An agricultural machine in accordance with an aspect of a preferred embodiment of the present invention is an agricultural machine to which a baler is attached, the agricultural machine including an inclination sensor to measure an inclination, an odometer to measure a traveled distance, and a controller configured or programmed to cause the traveled distance and the sensor value obtained by the inclination sensor to be stored such that the traveled distance and the sensor value are associate with each other.

A baler controller in accordance with an aspect of each preferred embodiment of the present invention can be realized by a computer. In this case, the present invention encompasses a control program to realize the baler controller by the computer, by causing the computer to function as the baler controller (software element), and a computer-readable storage medium in which the control program is stored.

An aspect of a preferred embodiment of the present invention makes it possible to prevent a bale from being ejected in a case where an inclination of a current position of a bale ejector is large. This advantageously makes it possible to prevent a bale from rolling due to a ground inclination or the like after the bale has been ejected.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

The following will discuss in detail a preferred embodiment of the present invention. In Preferred Embodiment 1, a tractor 10 and a baler 20 are connected to each other such that the tractor 10 can tow the baler 20 and at the same time, the tractor 10 and the baler 20 can communicate with each other. Then, the baler 20 being towed by the tractor 10 carries out a baling operation. Note that a combination of the tractor 10 serving as a traveling vehicle and the baler 20 serving as a working machine is also referred to as an agricultural machine 30.

In Preferred Embodiment 1, the tractor 10 includes an inclination sensor 300. Then, the tractor 10 carries out ejection control in consideration of an inclination of a place for ejection so that the bale ejected from the baler 20 will not roll from the place where the bale has been ejected. More specifically, the tractor 10 calculates an inclination of a current position of the bale ejecting part 240 which is a position where the bale is actually ejected, by using a relation between a position of the inclination sensor 300 in the tractor 10 and a position of the bale ejecting part 240 of the baler 20. Then, the tractor 10 controls ejection of the bale in consideration of the inclination thus calculated.

This makes it possible to prevent the bale, which has been ejected, from rolling due to an influence of, for example, an inclination of a land shape.

Figure 1:
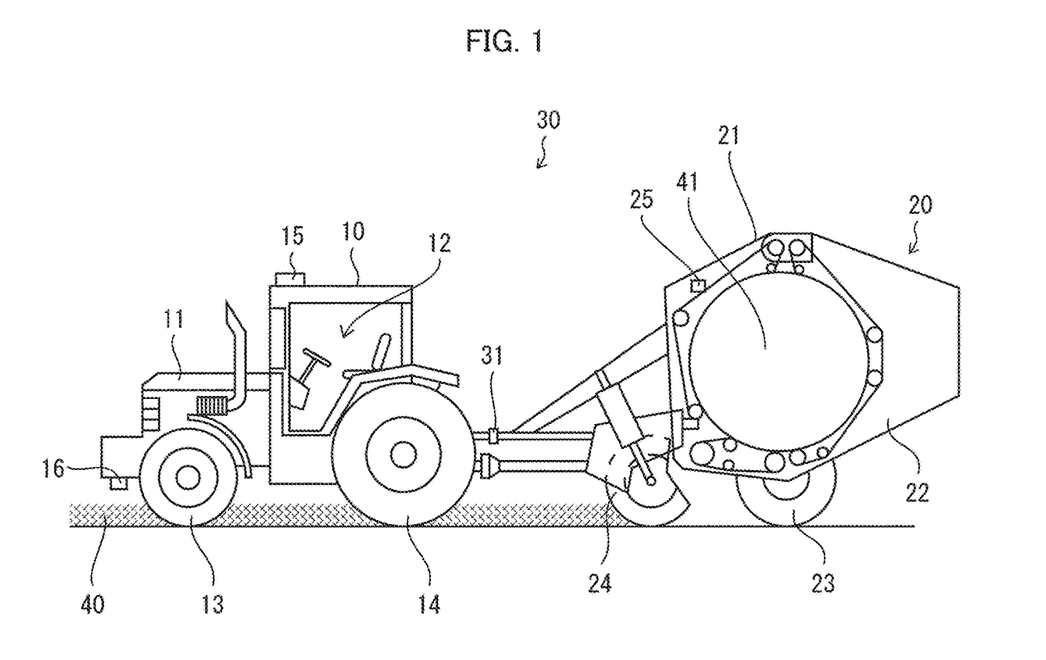
FIG. 1 is a side view of a tractor and a baler.

The following will discuss the tractor 10 serving as an example of the traveling vehicle, with reference to FIG. 1. FIG. 1 is a side view of the tractor 10 and the baler 20. The tractor 10 includes a vehicle body 11, a cabin 12 included in the vehicle body 11, and a front wheel 13 and a rear wheel 14 which travel under power from an engine or a motor (which are not illustrated). Further, the tractor 10 can reduce its speed or stop by using a brake (not illustrated).

The tractor 10 also includes a GPS section 15, and can obtain position information from a satellite. Use of the position information allows for automatic steering of the tractor 10. It is also possible that the tractor 10 is configured to automatically travel on a swath 40. The GPS section 15 can include an inertial measurement unit (IMU). The inertial measurement unit can complement the accuracy of the position information of a GPS. Further, since the inertial measurement unit makes it possible to measure respective angles of three axes, it is possible to measure a vehicle posture of the tractor 10, for example, on uneven ground and/or sloped ground of an agricultural field. Further, the tractor 10 also can include a measuring sensor 16 such as a light detection and ranging device (Lidar) or a camera. The tractor 10 can detect the swath 40 by the measuring sensor 16 and automatically travel on the swath 40.

Figure 2:
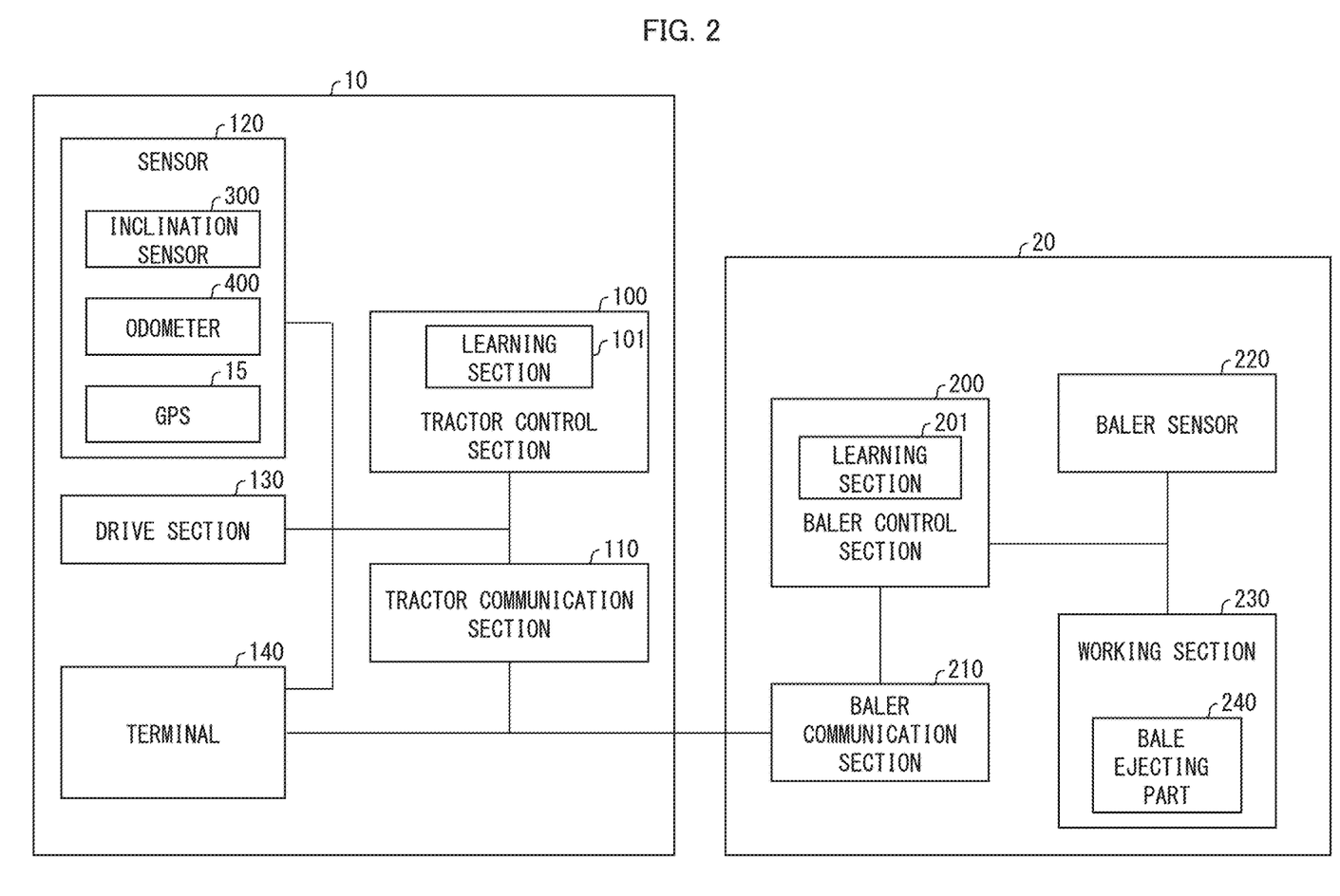
FIG. 2 is a functional block diagram illustrating a configuration of a main part of a tractor and a baler in accordance with a preferred embodiment of the present invention.

Next, the following will discuss control of the tractor 10, with reference to FIG. 2. FIG. 2 is a functional block diagram of the tractor 10 and the baler 20. As illustrated in FIG. 2, the tractor 10 includes a tractor control section (controller) 100, a tractor communication section (communicator) 110, a sensor 120, a drive section 130, and a terminal 140. These are connected to each other in conformity to international standard ISO 11783 for a network system based on a control area network (CAN), which is called ISOBUS.

The tractor control section 100 includes an electronic control unit (ECU), and typically includes a control processing unit (CPU), a memory, control software, and/or the like. The tractor control section 100 carries out control associated with traveling of the tractor 10 such as running and stopping of the tractor 10, control on a power take-off (PTO) which transmits power from an engine to the working machine, and control on a hitch for attachment of the working machine.

The tractor control section 100 includes a learning section 101. The learning section 101 performs machine learning by deep learning which is one kind of artificial intelligence (AI) so that a bale 41 formed by the baler 20 (described later) has a target size at the time when the tractor 10 stops.

The sensor 120 includes sensors related to a basic operation of the tractor 10, such as sensors for a vehicle speed, a transmission, an engine revolution speed, a PTO revolution speed, attachment of the working machine, and an oil pressure, and in addition, includes the GPS 15, the measuring sensor 16, and the inclination sensor 300 (the inertial measurement unit) which are described above, and an odometer 400. Information obtained by these sensors of the sensor 120 is sent to the tractor control section 100, and used for the control of the tractor 10.

The drive section 130 includes a power source such as the engine and the motor, the transmission, a clutch axle, the brake, the front wheel 13, the rear wheel 14, the PTO which drives the working machine, and the hitch. As the brake, an electric brake is used. These members of the drive section 130 are controlled by the tractor control section 100.

The terminal 140 includes a display section and an operation receiving section (which are not illustrated). The terminal 140 is used not only to display information obtained from sensors of the tractor 10 and the baler 20, but also to perform an operation related to an operation of the baler 20 and set the PTO and the hitch of the tractor 10.

The tractor communication section 110 carries out bidirectional communication (interactive communication) with the baler 20. Here, the tractor communication section 110 communicates in conformity with the international standard ISO 11783. Further, a tractor implement management (TIM) system is also mounted, so that the tractor communication section 110 receives a control signal from the baler 20. It is then possible to carry out control of speed of the tractor 10, control of the PTO revolution speed, control of height of the hitch, control of oil pressure, and/or the like. Note that the terminal 140 is connected with the baler 20 such that the tractor communication section 110 does not intervene between the terminal 140 and the baler 20. Furthermore, the terminal 140 is also connected with the tractor control section 100, etc.

The following will discuss the baler 20 which serves as an example of a working machine, with reference to back to FIG. 1. The baler 20 includes a frame 21, a rear gate 22, and a traveling wheel 23. The baler 20 is physically and electrically connected with the tractor 10 by a joint 31. The baler 20 is towed by the tractor 10, and forms a bale 41.

The baler 20 sends, into an inside of the baler 20 which is surrounded by the frame 21 and the rear gate 22, hay, straw, or the like, which are mowed pasture grass, wheat, and the like, in the swath 40, through an intake port 24. Then, the baler 20 forms the bale 41. The baler 20 is provided with a bale size sensor 25 in the inside, which is surrounded by the frame 21 and the rear gate 22. The bale size sensor 25 detects a size of the bale 41. When the size of the bale 41 becomes a predetermined size, the tractor 10 stops. Then, the bale 41 is wrapped and ejected from the baler 20.

Next, the following will discuss control of the baler 20, with reference to FIG. 2. The baler 20 includes a baler control section 200, a baler communication section 210, a baler sensor 220, and a working section 230. These are connected via ISOBUS.

The baler control section 200 includes an electronic control unit (ECU), and typically includes a control processing unit (CPU), a memory, control software, and the like. The baler control section 200 carries out control necessary to form a bale which has a predetermined size and a shape by compression of hay or straw.

The baler 20 includes mainly a baler called a round baler which forms cylinder-shaped bales 41, and a baler called a square baler which forms square bales 41. It is possible to express a shape of the bale 41 by length×width×height, where it is defined that (i) a length direction is a traveling direction of the baler 20, (ii) a width direction is a direction orthogonal to the traveling direction of the baler 20, and (iii) a height direction is a height direction of the baler 20. For example, a square bale 41 can have a size of 200 cm in length×80 cm in width×90 cm in height, and a round bale 41 can have a size of 120 cm in width and 150 cm in diameter (length and height). For example, in the case of the round baler, the size of the bale 41 is increased such that the size is even in the width direction, by evenly distributing hay or straw in the width direction. Then, when the bale 41 becomes a target size (with regard to diameter), the baler 20 stops working.

Further, the baler control section 200 sends, to the tractor 10 via the baler communication section 210, necessary information including, for example, a current size and/or a shape of the bale 41, or if necessary, a speed control request for, for example, speed reduction. The information is displayed on the terminal 140 of the tractor 10. Meanwhile, the width of the bale 41 is in general unequal to a width of the swath 40. Even if the bale 41 and the swath 40 have the same width, it is less likely that the swath 40 is uniform in density in the width direction of the swath 40. The swath 40 is often in the form of mounds. In light of this, in a case where the bale 41 is uneven in the width direction (uneven in width), the baler control section 200 sends such information to the tractor 10 and the information is displayed on the terminal 140. Then, the tractor 10 is driven by an operator on the basis of the information so as to travel aside from the center of the swath 40 so that the bale 41 can be evenly formed. Alternatively, the operator can drive the tractor 10 in a zigzag manner with respect to the center of the swath 40 so that the bale 41 can be evenly formed. As another alternative, it is possible to automatically drive the tractor 10 in a zigzag manner under control of the tractor control section 100.

The baler sensor 220 obtains, by measurement, information on the size, the shape, a weight, and a degree of evenness of a surface of the bale 41. The information obtained by the baler sensor 220 is sent to the baler control section 200 and used for control. In Preferred Embodiment 1, the size and the degree of evenness in the width direction of the bale 41 are measured by using, as the baler sensor 220, a plurality of bale size sensors 25 located along the width direction.

The working section 230 produces the bale 41. As described above, the working section 230 forms the bale 41 by compressing and shaping the hay, straw, and the like which have been taken in through the intake port 24. Further, after the working section 230 produces the bale 41, the working section 230 wraps the bale 41 and ejects the bale 41 from the bale ejecting part 240. Note that the bale 41 is ejected by opening the rear gate 22.

The baler communication section 210 carries out bidirectional communication in conformity with ISO 11783 with the tractor 10 and sends necessary information to the tractor 10. Further, the baler communication section 210 sends a request for, for example, speed control, as needed.

Figure 3:
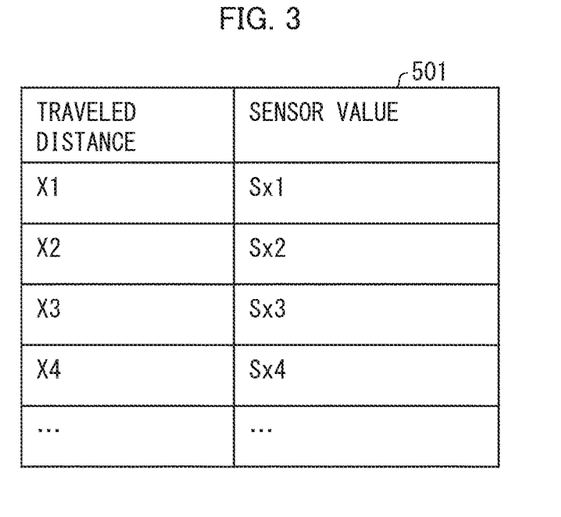
FIG. 3 is a diagram illustrating an example of inclination data stored in the tractor.

Next, the following will discuss in detail a baling operation by the tractor 10 and the baler 20. The tractor control section 100 stores, in a memory inside the tractor control section 100, inclination data in which each sensor value obtained by sensing of the inclination sensor 300 which is one sensor of the sensor 120 is associated with a traveled distance of the odometer 400. FIG. 3 shows an example of inclination data 501. In the example illustrated in FIG. 3, the traveled distance and the sensor value are associated with each other such that a first sensor value at a first traveled distance X1 is Sx1, a second sensor value at a second traveled distance X2 is Sx2, and so on. The traveled distance can be a value of the odometer 400. It is possible to use, as the traveled distance, a total traveled distance, or a traveled distance from a zero point which is a last bale ejection position.

The baler control section 200 instructs the working section 230 to start or end the baling operation, eject a bale, and/or the like. Moreover, the baler control section 200 controls a shape of the bale by use of the baler sensor 220, and also transmits size information of the bale to the terminal 140 and the tractor control section 100 via the baler communication section 210.

Figure 4:
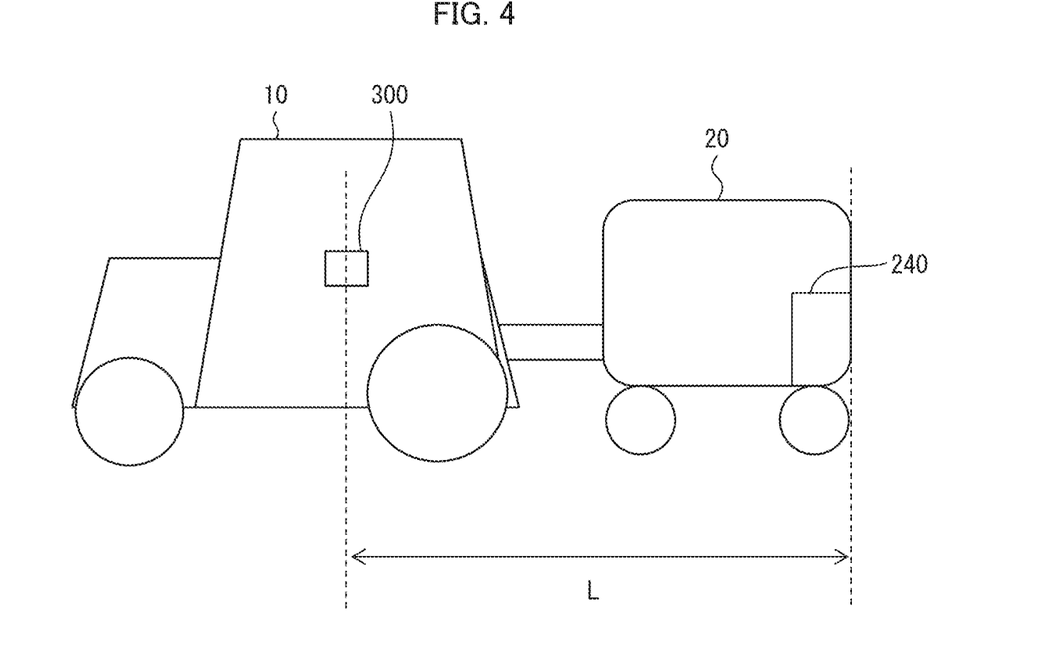
FIG. 4 is a diagram illustrating a relation between a position of an inclination sensor in the tractor and a position of a bale ejecting part of the baler.

The baler control section 200 calculates an ejection position in consideration of a relation between the position of the inclination sensor 300 in the tractor 10 and the position of the bale ejecting part 240 of the baler 20. This will be more specifically discussed, with reference to FIG. 4. FIG. 4 is a diagram illustrating the relation between the position of the inclination sensor 300 in the tractor 10 and the position of the bale ejecting part 240 of the baler 20. As illustrated in FIG. 4, in a case where a distance between the inclination sensor 300 and the bale ejecting part 240 is L, the baler control section 200 calculates, as an ejection position, a value obtained by subtracting L from a distance value of the odometer 400.

Figure 5:
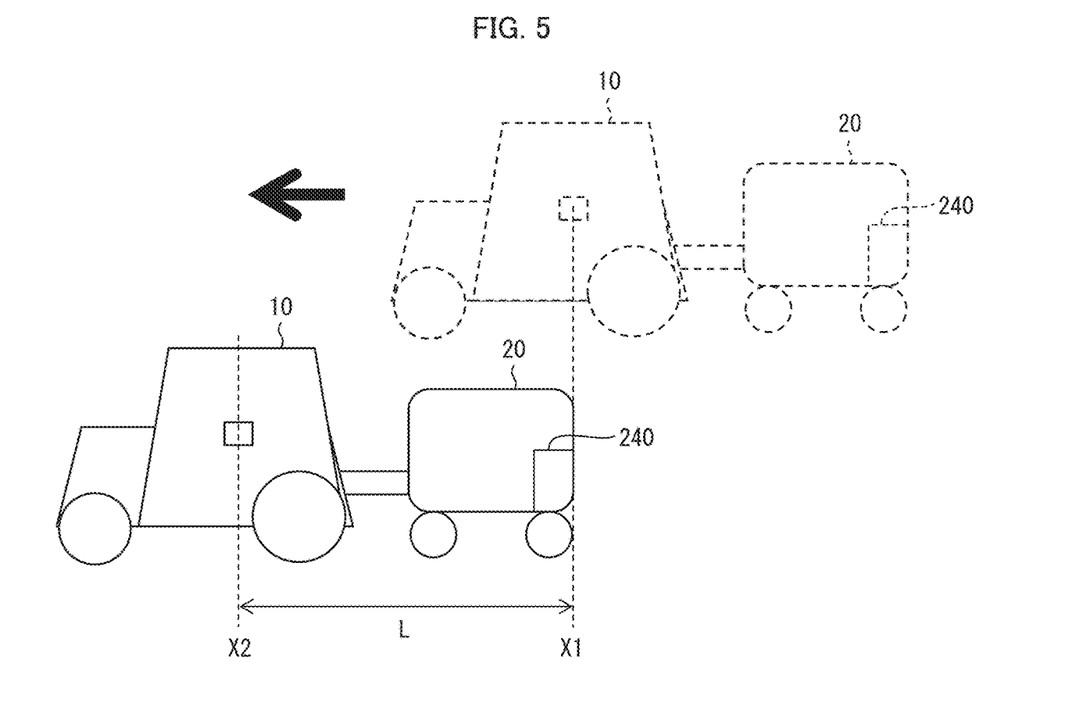
FIG. 5 is a diagram illustrating a reason why an ejection position calculated by an ejection position calculating section is an actual current position of the bale ejecting part.

Such calculation of the ejection position makes it possible to carry out bale ejection determination, by use of an inclination sensor value (ejection part inclination value) at an actual current position of the bale ejecting part 240. The following will discuss a calculation method with reference to FIG. 5. FIG. 5 is a diagram illustrating a method of calculation for causing the ejection position calculated by the baler control section 200 to be a point where the bale ejecting part 240 is present. As illustrated in FIG. 5, in a case where the tractor 10 travels forward and the traveled distance changes from X1 to X2, a point corresponding to the bale ejecting part 240 at the traveled distance X2 is not a point at the traveled distance X2 but is a point obtained by subtracting a distance L between the inclination sensor 300 and the bale ejecting part 240 from the traveled distance X2. For example, in a case where L=X2−X1 as illustrated in FIG. 5, a point of X1=X2−L is the point where the bale ejecting part 240 is present. Therefore, the inclination sensor value at the traveled distance X1 is the inclination sensor value at the current position of the bale ejecting part 240, at the traveled distance X2. The tractor 10 already passed through X1 and has data associated with a value of the inclination sensor 300 at that moment when the tractor passed through X1. Therefore, it is possible to obtain accurate inclination data.

Figure 6:
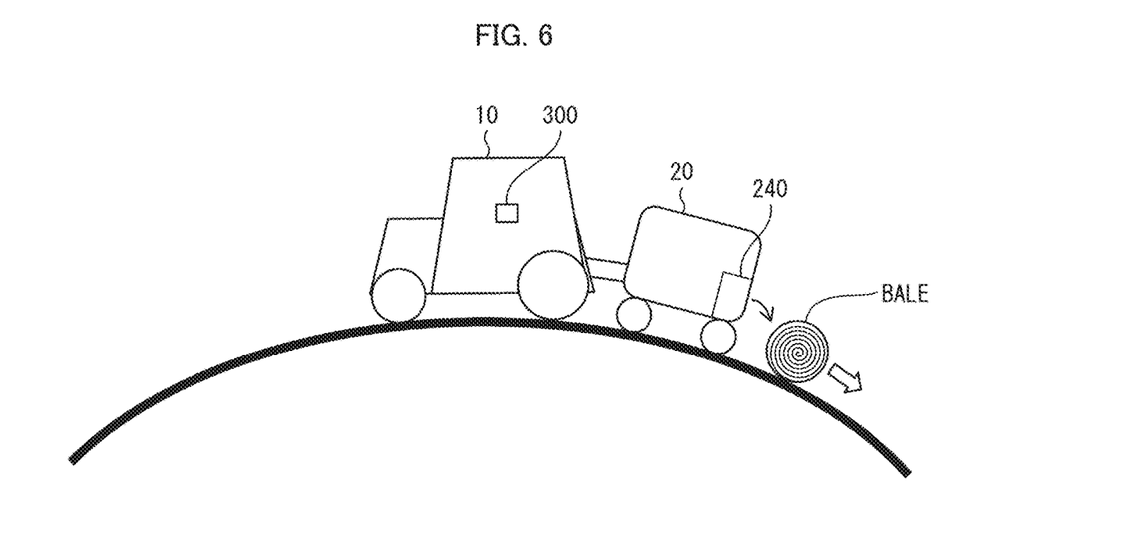
FIG. 6 is a diagram illustrating an example in which a bale unexpectedly rolls after being ejected.

This makes it possible to use the inclination sensor value at an actual point where the bale ejecting part 240 is present, so that the bale ejected can be prevented from unexpectedly rolling. A next explanation is provided with reference to FIG. 6. FIG. 6 is a diagram illustrating an example in which a bale unexpectedly rolls. As illustrated in FIG. 6, when the tractor 10 is at a point at the top of a rising slope which the tractor 10 has just climbed, the inclination sensor value of the inclination sensor 300 is close to a value at a level place. However, the bale ejecting part 240 is still at a point on the sloping road on the way to the top of the slope. In this state, in a case where whether to allow ejection of the bale is determined by using the value of the inclination sensor 300 at the present moment, it is determined that the bale can be ejected since the inclination sensor value of the inclination sensor 300 is close to the value at the level place. However, since the bale ejecting part 240 is still at the point on the sloping road on the way to the top of the slope, the bale will roll after being ejected. On the other hand, in a case where the inclination sensor value at the actual point where the bale ejecting part 240 is present is used, the inclination sensor value obtained by subtracting L from the traveled distance at the present moment is used. This makes it possible to prevent the above-described bad effect.

In a case where the baler control section 200 determines that the bale 41 can be ejected as a result of determining whether to allow ejection of the bale 41, the bale 41 is ejected. More specifically, the baler control section 200 not only obtains the size of the bale 41 from the baler sensor 220 but also obtains the inclination sensor value at the ejection position. The inclination sensor value here is a value calculated by the tractor control section 100. Then, in a case where (i) the size of the bale 41 is larger than a threshold value Vt (first threshold value) and (ii) the inclination sensor value is less than a threshold value It (second threshold value), the baler control section 200 determines that the bale 41 can be ejected. Further, in a case where (i) the size of the bale 41 is larger than the threshold value Vt and (ii) the inclination sensor value stays less than the threshold value It for not less than a predetermined time period after the inclination sensor value having exceeded the threshold value It becomes less than the threshold value It, the baler control section 200 determines that the bale 41 can be ejected.

The inclination sensor 300 detects an inclination of the tractor 10. For example, the inclination sensor 300 is a triaxial acceleration sensor. Note that it is possible to detect, by detecting the inclination of the tractor 10, for example, that whether the ground is sloped upward (higher on a front side than on a rear side) or downward (lower on the front side than on the rear side), whether the ground is sloped downward to the right or to the left, and/or the like.

The inclination sensor 300 transmits a detected value to the tractor control section 100.

The odometer 400 measures a traveled distance of the tractor 10. The odometer 400 transmits the traveled distance thus measured to the tractor control section 100.

Figure 7:
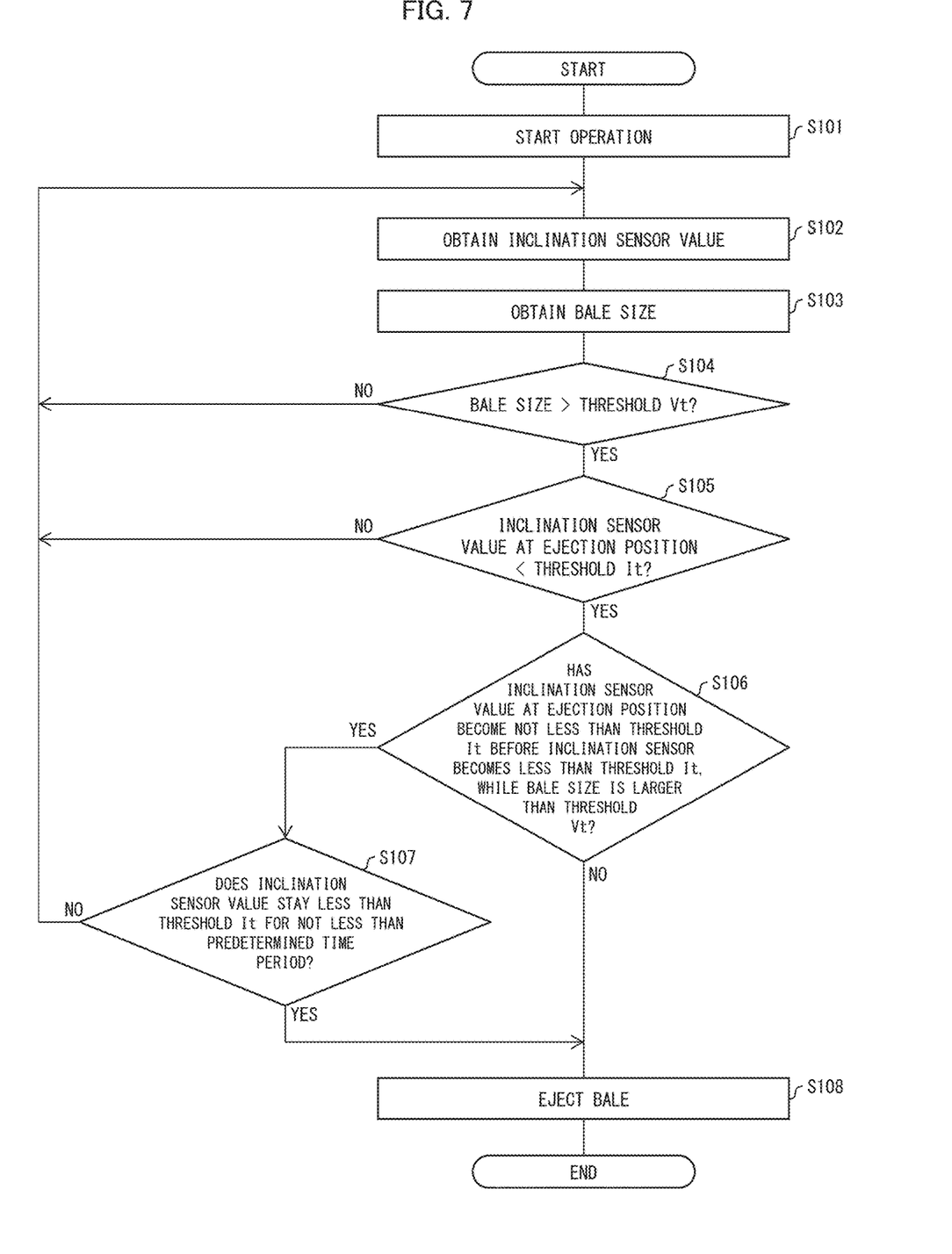
FIG. 7 is a flowchart illustrating a flow of a process in the tractor and the baler.

Next, the following will discuss a flow of a process in the tractor 10 and the baler 20, with reference to FIG. 7. FIG. 7 is a flowchart illustrating the flow of the process in the tractor 10 and the baler 20.

As illustrated in FIG. 7, when an operation of the tractor 10 is started and a baler process begins (S101), the tractor control section 100 obtains, from the inclination sensor 300, a sensor value measured by the inclination sensor 300 (S102). Then, the tractor control section 100 associates the sensor value thus obtained and a traveled distance value of the odometer 400 at that time with each other, and stores, in an internal memory, the sensor value and the traveled distance associated with each other. Note that the sensor value can be obtained in a predetermined cycle. For example, the predetermined cycle can be a cycle of several hundred milliseconds (ms) or several seconds (s).

Further, the baler control section 200 obtains the size of a bale from the baler sensor 220 (S103). The size of the bale can be obtained in a predetermined cycle. For example, the predetermined cycle can be a cycle of several seconds (s).

Thereafter, the baler control section 200 determines whether the size of the bale thus obtained is larger than the threshold value Vt (S104). The threshold value Vt is a preset bale size. Then, in a case where the size of the bale obtained is larger than the threshold value Vt (YES at S104), the baler control section 200 obtains a sensor value, that is, the inclination sensor value corresponding to the current position of the bale ejecting part 240 at that moment and determines whether or not the inclination sensor value is less than the threshold value It (S105). Then, in a case where (i) the inclination sensor value is less than the threshold value It (YES at S105) and (ii) the inclination sensor value has not been a value not less than the threshold value It before step S106 while the size of the bale is larger than the threshold value Vt (NO at S106), the baler control section 200 allows ejection of the bale and instructs the baler 20 to eject the bale (S108).

On the other hand, in a case where the size of the bale is not larger than the threshold value Vt (NO at S104) or in a case where at step S105, the inclination sensor value corresponding to the current position of the bale ejecting part 240 is not less than the threshold value It (NO at S105), the process returns back to step S102. Then, the process continues with steps to obtain the inclination sensor value and to obtain the size of the bale.

Further, in a case where the inclination sensor value has been a value not less than the threshold value It before step S106 while the size of the bale is larger than the threshold value Vt (YES at S106), the process proceeds to step S107. At step S107, it is determined whether the inclination sensor value stays less than the threshold value It for not less than the predetermined time period. Then, in a case where the inclination sensor value stays less than the threshold value It for not less than the predetermined time period (YES at S107), the process proceeds to step S108 and ejection of the bale is allowed. This makes it possible to prevent the bale from being ejected under a condition where level ground is not continuing, for example, in a case where the inclination sensor value has just become less than the threshold value It. This can consequently prevent the bale from unexpectedly rolling after ejection.

The above is the flow of the process in the tractor 10 and the baler 20.

As described above, in Preferred Embodiment 1, the baler control section 200, which controls ejection of a bale in the baler 20 attached to the tractor 10, is provided. The baler control section 200 obtains an ejection part inclination value from a relation between (a) the position of the inclination sensor 300 which is provided in the tractor 10 so as to detect the inclination of the tractor 10 and (b) the position of the bale ejecting part 240 of the baler 20. The ejection part inclination value is a sensor value of the inclination sensor 300 corresponding to the current position of the bale ejecting part 240. Further, the baler control section 200 allows the bale to be ejected in a case where (i) the size of the bale in the baler 20 is larger than a first threshold value and (ii) the ejection part inclination value is less than a second threshold value.

Preferred Embodiment 2

The following will discuss a tractor 10 and a baler 20 in accordance with Preferred Embodiment 2, with reference back to FIG. 2. In the tractor 10 in accordance with Preferred Embodiment 2, a tractor control section 100 stores, in a memory, (i) a traveling position of the tractor 10 and (ii) an inclination sensor value of an inclination sensor 300 such that the traveling position of the tractor and the inclination sensor value of the inclination sensor 300 are associated with each other, as inclination data. This makes it possible to derive the inclination sensor value corresponding to the current position of a bale ejecting part 240 of the baler 20 by using an inclination sensor value at a point that is as suitable as possible even in a case where, for example, the tractor 10 does not move straight on but moves along a curved line.

The tractor control section 100 obtains a vehicle speed and a steering angle of the tractor 10 from a drive section 130, a measurement value obtained by an inertial measurement unit (IMU) which is the inclination sensor 300, and/or the like. Then the tractor control section 100 calculates a traveling position of the tractor 10 from such information.

Further, the baler control section 200 calculates a traveling position of the bale ejecting part 240, from the traveling position of the tractor 10 calculated by the tractor control section 100 and an outer shape and a size of the baler 20, etc. Then, the baler control section 200 regards, as the inclination sensor value at the current position of the bale ejecting part 240, an inclination sensor value at a traveling position of the tractor 10 at the shortest distance from the traveling position of the bale ejecting part 240.

Figure 8:
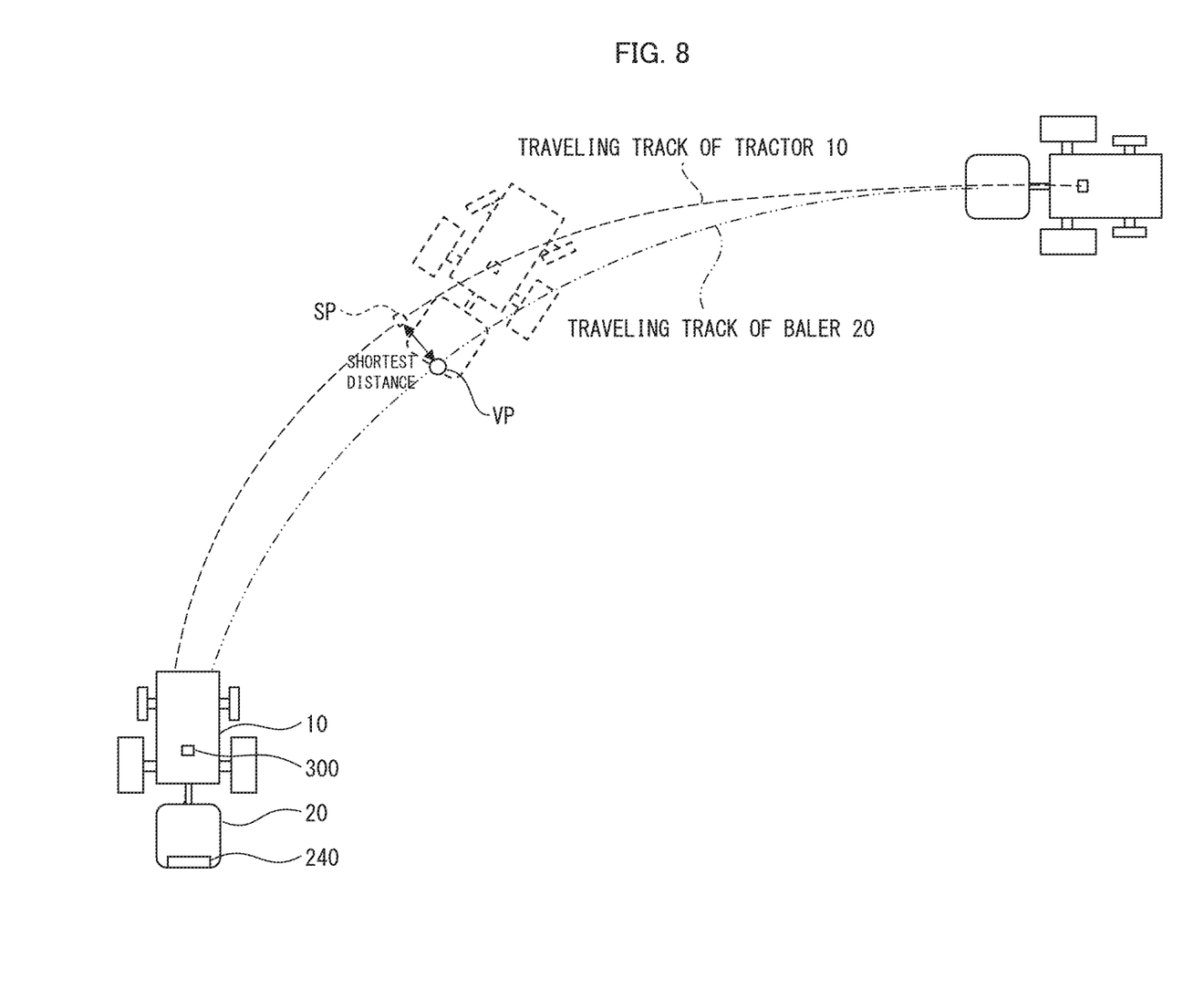
FIG. 8 is a diagram illustrating a method of determining an inclination sensor value corresponding to a current position of a bale ejecting part in a case where a tractor travels along a curved line.

The above will be more specifically discussed with reference to FIG. 8. FIG. 8 is a diagram illustrating a method of determining an inclination sensor value corresponding to the current position of the bale ejecting part 240 in a case where the tractor 10 travels along a curved line. FIG. 8 shows respective traveling tracks of the tractor 10 and the baler 20. In a case where the tractor 10 travels along a curved line, the traveling track of the baler 20 attached to the back of the tractor 10 is on an inner side of the traveling track of the tractor 10. Under the circumstances, assume a case where, simply, an inclination sensor value at a traveling position, which is obtained by subtracting, from a traveled distance of the tractor 10, a distance between the inclination sensor 300 and the bale ejecting part 240, is regarded as the inclination sensor value at the current position of the bale ejecting part 240. In such a case, that inclination sensor value at the current position of the bale ejecting part 240 does not agree with an inclination at an actual current position of the bale ejecting part 240.

In light of the above, in Preferred Embodiment 2, an inclination sensor value regarded as the inclination sensor value at the point where the bale ejecting part 240 is present is an inclination sensor value of the inclination sensor 300 at a point (point SP in the example illustrated in FIG. 8) which is on the traveling track of the tractor 10 and which is at the shortest distance from the current position of the bale ejecting part 240 (point VP in the example illustrated in FIG. 8). This makes it possible to use the inclination sensor value at a point which is the closest to the actual current position of the bale ejecting part 240. This consequently makes it possible to reduce or minimize a difference from the inclination at the actual point where the bale ejecting part 240 is present.

Variation 1

In the preferred embodiments described above, the baler control section 200 determines whether to carry out bale ejection. Note that in addition to such a configuration, it is also possible to have a configuration in which a bale 41 can be ejected according to an instruction of an operator while whether to carry out the bale ejection can be automatically determined. In other words, the tractor 10 is provided with an ejection instruction button or the like which receives a bale ejection instruction. Then, when the button is pressed down by an operator, the tractor 10 transmits a bale ejection instruction to the baler 20, so that the baler 20 carries out bale ejection according to that instruction.

For example, in a case where the inclination sensor 300 indicates that an inclination is larger than a predetermined angle, the bale 41 is not to be ejected because of the above-described safety problem. However, there may be a case where an operator knows from his/her experience that no problem will occur even if the bale 41 is ejected. Accordingly, in Variation 1, the ejection instruction button or the like is provided, so that the bale 41 can be ejected by judgement of the operator.

It is possible to cause one or both of the learning section 201 of the baler control section 200 and the learning section 101 of the tractor control section 100 to learn a place where the bale 41 is ejected by using the ejection instruction button or the like. Then, it is possible to cause a terminal 140 to display, under a similar condition, a message that highly possibly, a bale can be ejected, and allow an operator to confirm the massage. Subsequently, in a case where accuracy increases as a result of repeating such a confirmation operation, it is possible to have a configuration in which the bale 41 is automatically ejected under a similar condition.

With the above configuration, it is possible to manually eject a bale at a desired point, while a state where whether to eject a bale can be automatically determined is kept.

Variation 2

In the preferred embodiments described above, it is possible to have a configuration in which inclination data generated is stored and then, that data is used for determination of whether to allow ejection of a bale when work is done on the same agricultural field from next time.

The tractor 10 does not always travel the same route every time on a certain agricultural field, but travels different places depending on a work range of a working machine in use. Therefore, by accumulating past inclination data, it is possible to use the past inclination data as inclination data indicative of a land shape closer to an actual land shape.

In the above preferred embodiments, an inclination sensor value of the inclination sensor 300 and (a) a traveled distance of the tractor or (b) a traveling position of the tractor 10, which is calculated from, for example, a vehicle speed, a steering angle, a measurement value of the IMU, and/or the like, are stored such that the inclination sensor value and (a) the traveled distance or (b) the traveling position are associated with each other. Note however that a preferred embodiment of the present invention is not limited to such a configuration. It is alternatively possible to have a configuration in which the tractor 10 includes a global positioning system (GPS), and (i) a position of the tractor 10, which is obtained from the GPS, and (ii) the inclination sensor value are stored such that the position and the inclination sensor value are associated with each other. Then, data in which the position and the inclination sensor value are associated with each other is used for determination of whether to allow ejection of a bale from next time.

Control blocks of the tractor 10 (in particular, the tractor control section 100 and the baler control section 200) of the tractor 10 can be realized by a logic circuit (hardware) provided in an integrated circuit (IC chip) or the like or can be alternatively realized by software.

In the latter case, the tractor 10 includes a computer that executes instructions of a program that is software realizing the foregoing functions. The computer, for example, includes at least one processor (control device) and at least one computer-readable storage medium storing the program. Processes of preferred embodiments of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of a preferred embodiment of the present invention can also be achieved in the form of a computer data signal in which the program is embodied via electronic transmission and which is embedded in a carrier wave.

The present invention is not limited to the preferred embodiments, but can be altered by a skilled person in the art within the scope of the claims. The present invention also encompasses, in its technical scope, any preferred embodiment derived by combining technical features or aspects means disclosed in differing preferred embodiments. Further, it is possible to form a new technical feature by combining the technical features or aspects disclosed in the respective preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine to control ejection of a bale in a baler attached to a tractor, the agricultural machine comprising:

a baler controller configured or programmed to:

obtain an ejector inclination value from a positional relation between an inclination sensor to detect an inclination of the tractor and a bale ejector of the baler, the ejector inclination value being a sensor value of the inclination sensor, the sensor value corresponding to the bale ejector; and allow ejection of the bale in a case where (i) a size of the bale in the baler is larger than a first threshold value, and (ii) the ejector inclination value is less than a second threshold value; wherein the baler controller is configured or programmed to obtain, as the ejector inclination value, the sensor value in data in which each traveled distance of the tractor and each sensor value of the inclination sensor are associated with each other, the sensor value thus obtained corresponding to a traveled distance obtained by subtracting a distance between the inclination sensor and the bale ejector from a current traveled distance.

2. An agricultural machine to control ejection of a bale in a baler attached to a tractor, the agricultural machine comprising:

a baler controller configured or programmed to:

obtain an ejector inclination value from a positional relation between an inclination sensor to detect an inclination of the tractor and a bale ejector of the baler, the ejector inclination value being a sensor value of the inclination sensor, the sensor value corresponding to the bale ejector; and allow ejection of the bale in a case where (i) a size of the bale in the baler is larger than a first threshold value, and (ii) the ejector inclination value is less than a second threshold value; wherein the baler controller is configured or programmed to obtain:

a traveling position of the tractor; and as the ejector inclination value, the sensor value in data in which each traveling position of the tractor and each sensor value of the inclination sensor are associated with each other, the sensor value thus obtained corresponding to a traveling position which is a shortest distance apart from a point where the bale ejector is present.

3. An agricultural machine to control ejection of a bale in a baler attached to a tractor, the agricultural machine comprising:
a baler controller configured or programmed to:
obtain an ejector inclination value from a positional relation between an inclination sensor to detect an inclination of the tractor and a bale ejector of the baler, the ejector inclination value being a sensor value of the inclination sensor, the sensor value corresponding to the bale ejector; and
allow ejection of the bale in a case where (i) a size of the bale in the baler is larger than a first threshold value, and (ii) the ejector inclination value is less than a second threshold value; wherein
the baler controller is configured or programmed to allow ejection of the bale, in a case where while (i) the size of the bale is larger than the first threshold value, (ii) the ejector inclination value stays less than the second threshold value for not less than a predetermined time period after the ejector inclination value having exceeded the second threshold value becomes less than the second threshold value.

4. An agricultural machine to control ejection of a bale in a baler attached to a tractor, the agricultural machine comprising:
a baler controller configured or programmed to:
obtain an ejector inclination value from a positional relation between an inclination sensor to detect an inclination of the tractor and a bale ejector of the baler, the ejector inclination value being a sensor value of the inclination sensor, the sensor value corresponding to the bale ejector; and
allow ejection of the bale in a case where (i) a size of the bale in the baler is larger than a first threshold value, and (ii) the ejector inclination value is less than a second threshold value;
an odometer to measure a traveled distance; and
a controller configured or programmed to cause the traveled distance and a corresponding sensor value obtained by the inclination sensor to be stored such that the traveled distance and the corresponding sensor value are associated with each other; wherein
the corresponding sensor value is an inclination measured by the inclination sensor.

* * * * *